United States Patent
Anderson et al.

(10) Patent No.: US 6,213,115 B1
(45) Date of Patent: Apr. 10, 2001

(54) PORTABLE PLATFORM FOR COOKING SURFACE

(75) Inventors: Annette Anderson, Bluffdale; Robert L. May, Riverton; Michael Deardon, Orem, all of UT (US)

(73) Assignee: Stove In A Can, Inc., Lindon, UT (US)

( * ) Notice: Subject to any disclaimer, the term of this patent is extended or adjusted under 35 U.S.C. 154(b) by 0 days.

(21) Appl. No.: 09/358,042

(22) Filed: Jul. 21, 1999

(51) Int. Cl.$^7$ ............................................. F23D 3/00
(52) U.S. Cl. ................................... 126/46; 431/203
(58) Field of Search ............................. 126/43, 44, 45, 126/211, 46; 431/203

(56) References Cited

U.S. PATENT DOCUMENTS

| | | | |
|---|---|---|---|
| 881,199 | 3/1908 | Palmer | 126/215 |
| 1,104,383 | * 7/1914 | Potter | 126/43 |
| 1,210,099 | * 12/1916 | Pohl | 126/43 |
| 1,285,208 | 11/1918 | Joite . | |
| 1,446,353 | 2/1923 | Slocum | 126/43 |
| 1,471,788 | 10/1923 | Gardner | 126/215 |
| 2,040,676 | * 5/1936 | Stevens et al. | 126/211 |
| 2,488,014 | 11/1949 | Higman | 126/59 |
| 2,622,017 | 12/1952 | Bramhall et al. | 44/40 |
| 3,124,432 | 3/1964 | Gentry | 44/40 |
| 3,261,346 | 7/1966 | Waddell et al. | 126/59.5 |
| 3,367,758 | 2/1968 | Ambrose et al. | 44/40 |
| 3,371,659 | 3/1968 | Paspalas | 126/43 |
| 3,427,368 | 2/1969 | Anderson | 264/3 |
| 3,502,068 | 3/1970 | Henson | 126/262 |
| 3,606,765 | * 9/1971 | Schmidt | 126/43 |
| 3,613,658 | 10/1971 | Knowles et al. | 126/59.5 |
| 3,647,403 | 3/1972 | Davis, Jr. | 44/6 |
| 3,759,675 | 9/1973 | Lazarus et al. | 44/38 |
| 3,769,957 | * 11/1973 | Ozaki | 126/43 |
| 3,797,990 | 3/1974 | Rogers et al. | 431/291 |
| 3,998,922 | 12/1976 | Weiss | 264/255 |
| 4,043,765 | 8/1977 | Tanner | 44/14 |
| 4,100,912 | 7/1978 | Doane . | |
| 4,110,261 | 8/1978 | Newland | 252/522 |
| 4,134,385 | 1/1979 | Barter . | |
| 4,164,930 | 8/1979 | Johnston . | |
| 4,243,013 | 1/1981 | Goon et al. . | |
| 4,272,252 | 6/1981 | Altman | 44/40 |

(List continued on next page.)

FOREIGN PATENT DOCUMENTS

| | | | |
|---|---|---|---|
| 48663 | * 4/1934 | (DK) | 126/43 |
| 2253 | 1/1909 | (GB) | 126/215 |
| 5857 | 2/1916 | (GB) | 126/43 |
| 5867 | 2/1916 | (GB) | 126/43 |
| 1194315 | 6/1970 | (GB) . | |

OTHER PUBLICATIONS

Product Packaging Label "Magic Stove," available on information and belief in Jul., 1999 before the filing date of this application.

Canadian Trade–mark Data regarding Magic Stove Trademark, available on information and belief in Jul., 1999 before the filing date of this application.

(List continued on next page.)

Primary Examiner—Ira S. Lazarus
Assistant Examiner—Sara Clarke
(74) Attorney, Agent, or Firm—Workman Nydegger & Seeley; David B. Dellenbach (57) ABSTRACT

A portable, self-contained stove system includes (i) a container; and (ii) a platform which selectively fits into storage and cooking positions with respect to the container. The platform is configured to be selectively mounted on a container and to selectively support a cooking surface thereon. Platforms are disclosed which are specially designed to separate the flow path of fire out of the container from that of oxygen flowing into the container. Platforms are also disclosed which are adjustable such that they can be selectively disposed within a container before and/or after use.

20 Claims, 7 Drawing Sheets

U.S. PATENT DOCUMENTS

| | | | |
|---|---|---|---|
| 4,424,798 | 1/1984 | Volk . | |
| 4,654,049 | 3/1987 | Smith, Jr. | 44/10 B |
| 4,722,322 | 2/1988 | Varney et al. | 126/9 R |
| 4,756,719 | 7/1988 | Saito | 44/541 |
| 4,855,098 | 8/1989 | Taylor | 264/103 |
| 4,896,653 | 1/1990 | Eke et al. . | |
| 4,913,126 | 4/1990 | McCall . | |
| 5,012,791 | 5/1991 | McCabe | 126/43 |
| 5,163,145 | 11/1992 | Parks . | |
| 5,211,157 | 5/1993 | Schwartz et al. . | |
| 5,226,405 | 7/1993 | Snow | 126/25 B |
| 5,307,799 | 5/1994 | Scarnato et al. | 126/45 |
| 5,359,988 | 11/1994 | Hait . | |
| 5,405,262 | 4/1995 | Appel . | |
| 5,495,845 | 3/1996 | Hait . | |
| 5,584,283 | 12/1996 | Messina | 126/43 |
| 5,711,210 | 1/1998 | Kaufman . | |
| 5,842,463 | 12/1998 | Hall . | |
| 5,873,300 | 2/1999 | Kuhlman . | |
| 5,967,769 | 10/1999 | Thompson | 431/288 |
| 5,979,428 | 11/1999 | Greene, Jr. | 126/50 |

OTHER PUBLICATIONS

Website pages, "Scientific Utility Brands International Inc.," available on information and belief in Jul., 1999 before the filing date of this application.

"Emergency Candles" recipe from "Cookin' With Home Storage," copyright 1991.

\* cited by examiner

PORTABLE PLATFORM FOR COOKING SURFACE

BACKGROUND OF THE INVENTION

1. The Field of the Invention

This invention is in the field of portable stoves. More specifically, this invention is in the field of portable stove systems having a container, a combustible composition disposed within the container, and a platform for maintaining a cooking surface above the container as the combustible composition burns.

2. The Relevant Technology

Portable heating and cooking devices are useful in a variety of different settings. Portable heating and cooking devices can be used by outdoor enthusiasts, campers, anglers, hikers, mountain climbers, emergency personnel, cooks, food service teams, search and rescue teams, and a variety of different individuals for convenient indoor and outdoor heating and cooking, and for emergency use. Such portable devices can typically be stored, then used when needed or desired, such as on an emergency basis for heating or for cooking.

One portable heating device comprises a container, such as a can into which a combustible chemical is placed. The chemical can be ignited and burns until burning out or until being extinguished. While such typical systems are useful for heating, such systems require that the can containing the combustible chemical be placed underneath a pan, bowl, or other surface in order to heat a food or liquid.

In order to retain the pan or bowl above the combustible chemical, a stand is typically placed over the can containing the combustible chemical and the cooking surface is placed on the stand. Such stands can become lost, can be bulky and awkward to store, and take up space during storage and transportation. In addition, certain portable heating systems featuring a chemical composition disposed in a can are designed for heating food only, rather than cooking food, and cannot boil water even after 60 minutes.

Another portable heating and cooking system is a system which employs a can into which a mixture of sawdust and wax are placed. A wick is placed into the sawdust/wax mixture to initially ignite the mixture. Other heating and cooking systems comprise a can having cardboard therein surrounded by wax. These systems are also required to be placed underneath a pan or bowl or other surface in order to heat the surface.

There is therefore a need in the art for an improved portable stove system. More specifically, there is a need in the art for a portable stove system which conserves space and avoids risk of loss of components during storage and transportation. Furthermore, there is a need in the art for a portable stove having a prolonged burning life.

SUMMARY AND OBJECTS OF THE INVENTION

It is therefore an object of the invention to provide an improved portable stove and an improved portable stove system.

It is another object of the invention to provide a self-contained, portable stove.

It is another object of the invention to provide a self-contained, portable stove system having a cooking platform which can be placed within the stove during storage.

It is another object of the invention to provide a self-contained, portable stove system having a cooking platform which fits within the stove during storage.

It is another object of the invention to provide a self-contained, portable stove system having a cooking platform which is selectively mounted on the top surface of the stove.

It is another object of the invention to provide a self-contained portable stove system with means for oxygenating the interior of the stove.

It is another object of the invention to provide a self-contained portable stove which has a prolonged burning life.

It is another object of the invention to provide a portable stove which is convenient and inexpensive to produce.

It is another object of the invention to provide a portable stove system in which a lid of the stove can be selectively used as a cooking surface.

A portable, self-contained stove system of the present invention comprises: (i) a container; and (ii) an adjustable cooking platform having a storage position and a cooking position. The cooking platform is configured to be selectively coupled to the container in one of: (i) the cooking position; and (ii) the storage position.

The platform is selectively oriented at least partially outside of the container during use and is selectively oriented within the container during storage, thereby conserving space and preventing loss of the platform during storage. The cooking platform is configured to extend the cooking surface above the stove and, in one embodiment, to enable oxygen to reach the interior surface of the container body, such as by having one more apertures therethrough.

The container serves as a convenient stove. One embodiment of the container comprises: (i) a container body having an opening, an interior surface and an exterior surface; (ii) a lid selectively mounted on the container body; and (iii) an annular lip which is configured to selectively receive one of: (A) the lid; and (B) the cooking platform thereon. One lip of the present invention has a groove which selectively receives the lid or the cooking platform therein.

In one embodiment, the adjustable cooking platform comprises a split-collar, i.e., a collar having a slit therein. The split-collar has sufficient flexibility that the first and second ends of the collar can be moved with respect to each other. The collar can thus be selectively compressed such that the collar can be moved past an interior portion of the container which has an internal diameter which is smaller than the groove of the container. This allows the collar to be conveniently stored within the container. Upon removal from the container, the first and second ends of the collar extend resiliently outwardly and/or can be extended outwardly when it is desired to mount the collar within the groove of the container for cooking use.

The platform can thus be readily compressed and placed within the container for storage and then readily removed from the container and mounted in the groove of the container during use. A cooking surface, such as the lid, a pan, a bowl, or another cooking surface may then be placed on the platform.

In one embodiment, holes extend through the platform to thereby allow oxygen to flow into the container while a pan or bowl is placed on top of the cooking platform. In another embodiment, however, the platform may be comprised of a solid piece with no holes therein.

The stove system further comprises a combustible composition disposed within the container. The combustible composition is preferably a mixture comprising a base and a filler material. The base may be a wax material which is typically a solid at room temperature, for example, or, optionally, a material which is typically a liquid at room temperature. The filler material may be a cellulose-containing material such as wood shavings. An optional wick extends through the combustible composition and can be readily employed to initially ignite the composition.

The stove system is thus an efficient, self-contained system. The compressible cooking platform is selectively stored within the container, thereby preventing loss of the platform and thereby conserving space.

The lid acts both as a cover and as a cooking surface. The lid is configured to selectively (i) mount on the container in a storage position to thereby close the opening of the container; and (ii) mount on the cooking platform in a cooking position to thereby serve as a cooking surface. Food or water may be placed on the lid as a fire within the container heats the food or water. When the cooking or heating is finished, the lid also acts as an extinguisher and can be placed onto the container to extinguish the fire within the container.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
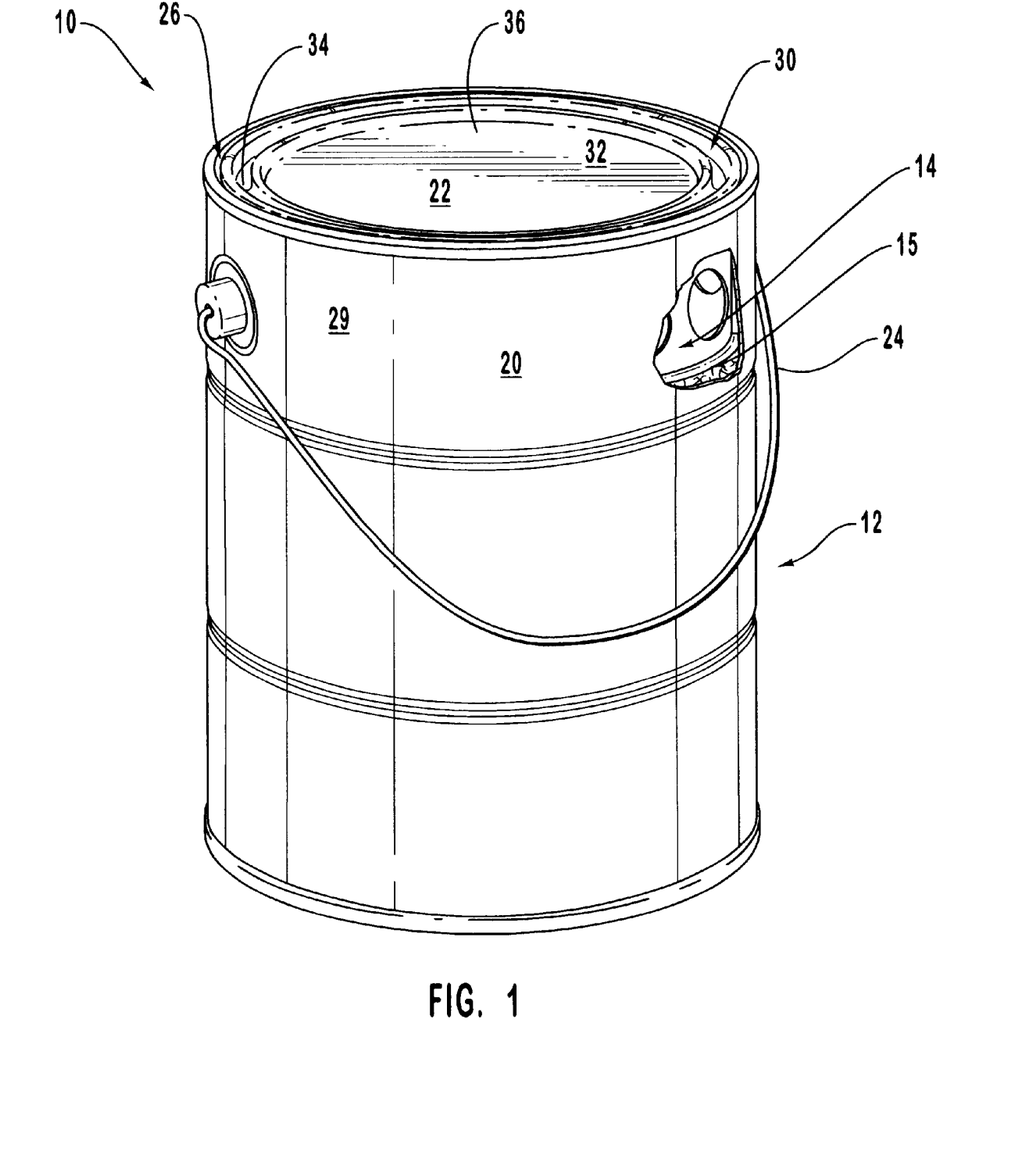
FIG. 1 is a perspective view of a storage position of the portable stove of the present invention with the lid of the container mounted in a groove of the container. A cooking platform is disposed below the lid within the container.

With reference now to FIG. 1, a storage position of a portable stove system 10 of the present invention is shown. Stove system 10 comprises: (i) a container 12; and (ii) an adjustable cooking platform 14 which selectively fits within container 12 during storage, but can be selectively disposed at least partially outside of container 12 during use. Storing platform 14 within container 12 conserves space and prevents loss or misplacement of platform 14. System 10 further comprises a combustible composition 15 disposed within the container.

In the embodiment of FIG. 1, platform 14 rests upon the combustible composition 15 in the storage position because combustible composition 15 is a solid at room temperature. Other combustible compositions may be employed, however, such as compositions which are liquid at room temperature.

Figure 2:
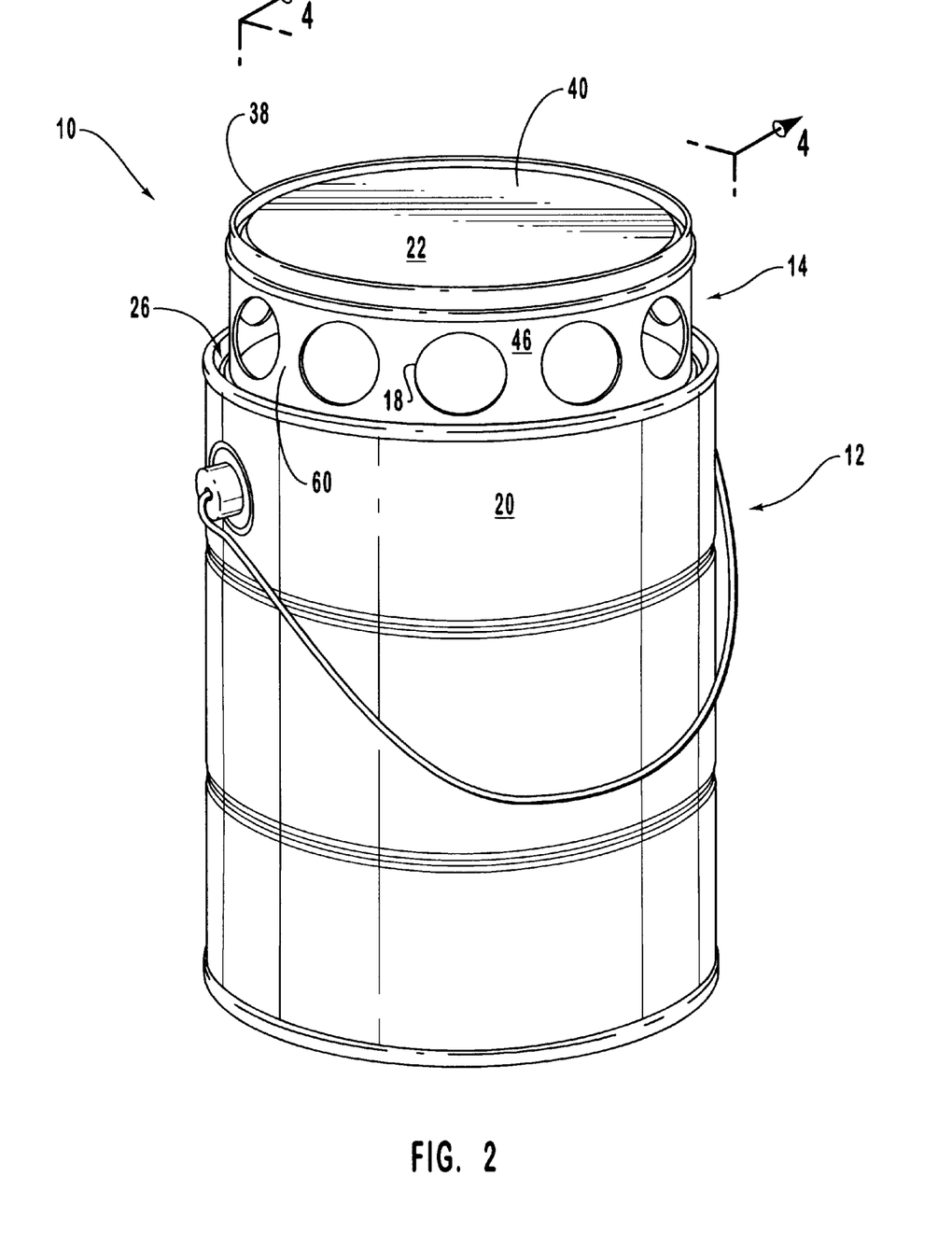
FIG. 2 is a perspective view of a cooking position of the portable stove of FIG. 1 with the lid of the container inverted (i.e., upside down) with respect to the position of FIG. 1 and mounted on the cooking platform which is mounted in the groove of the container.
Figure 3:
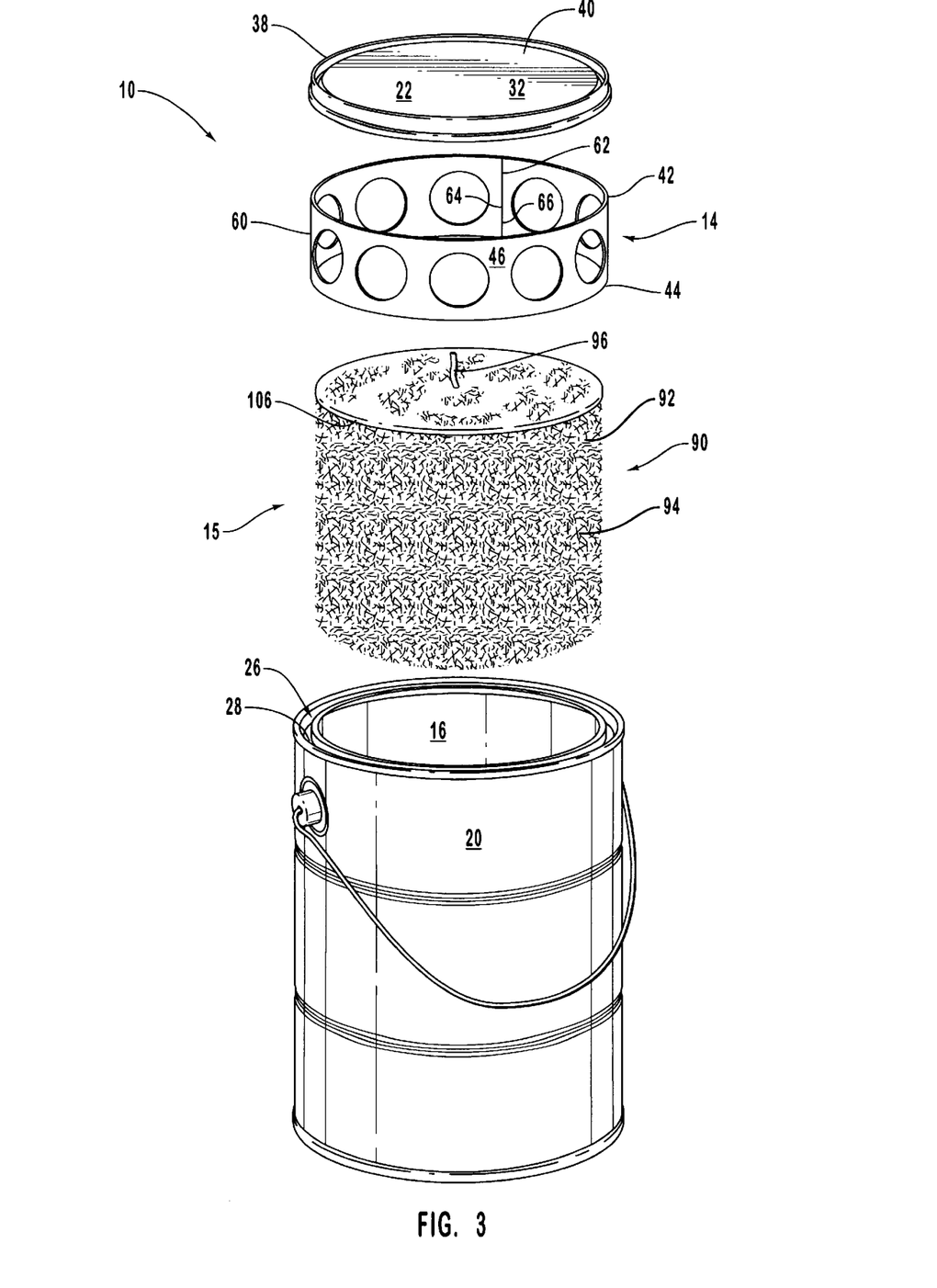
FIG. 3 is an exploded view of the container body, combustible composition, platform, and lid of the stove system of FIG. 2, in ascending order.

System 10 is shown in a cooking position in FIG. 2. As shown, cooking platform 14 is selectively disposed at least partially outside of container 12 during use. With reference now to FIGS. 1–3, container 12 comprises: (i) a container body 20; and preferably: (ii) a lid 22 selectively mounted on container body 20; a (iii) a handle 24 connected to container body 20; and (iv) an annular lip 26 extending from container body 20 and defining an annular groove 28 (FIG. 3). Lip 26 is configured to selectively receive one of: (A) lid 22; and (B) cooking platform 14 within the groove 28 of lip 26.

Lip 26 is one example of means for selectively mounting one of: (i) lid 22; and (ii) platform 14 on container body 20. However, additional means for selectively mounting one of: (i) lid 22; and (ii) platform 14 on container body 20 include another mating relationship, a friction fit, a non-annular lip, multiple lip members extending about the container wall, and a lip without a recessed groove, or other mounting means.

Container 12 may be comprised of one or more members and may have a variety of different shapes and sizes. In one embodiment, container 12 comprises a triple-sealed gallon size aluminum paint can. However, a variety of different containers having a variety of different sizes and shapes may be employed in the present invention, such as a ½ gallon, 4 inch tall can.

With continued reference to FIGS. 1–3, platform 14 has opposing upper and lower edges 42, 44 (FIG. 3) which interface with lid 22 and container 12, respectively. Adjustable platform 14 is compressible and extendible. Consequently, platform 14 can be selectively placed within container 12 for storage and then readily, selectively removed from container 12 and placed within groove 28 of lip 26 during use. A cooking surface, such as lid 22, another pan, a bowl, or another cooking surface may then be mounted on platform 14 to thereby raise the lid, pan, bowl, or other cooking surface above lip 26. This dynamic raises the cooking surface further above a fire within container 12.

Cooking platform 14 is configured to enable oxygen to reach the interior surface 16 (FIG. 3) of container 12, such as by having one more apertures 18 therethrough. Optionally, however, a cooking platform similar to platform 14 can be configured without apertures therethrough if the container has one or more apertures therethrough or if the cooking surface is configured or oriented such that oxygen reaches the interior surface 16 (e.g., by covering only a portion of a platform).

As indicated above, lid 22 is shown in a storage position in FIG. 1. As shown, lid 22 has an annular lip 30 extending from a body portion 32. Lip 30 defines an annular upper groove 34 on upper side 36 thereof and an annular ridge 38 on an opposite, lower side 40 thereof (see FIGS. 2 and 3). In the storage position shown in FIG. 1, the annular ridge 38 of lid 22 is disposed within annular groove 28 (FIG. 3) of container 12 and annular upper groove 34 is empty.

Figure 4:
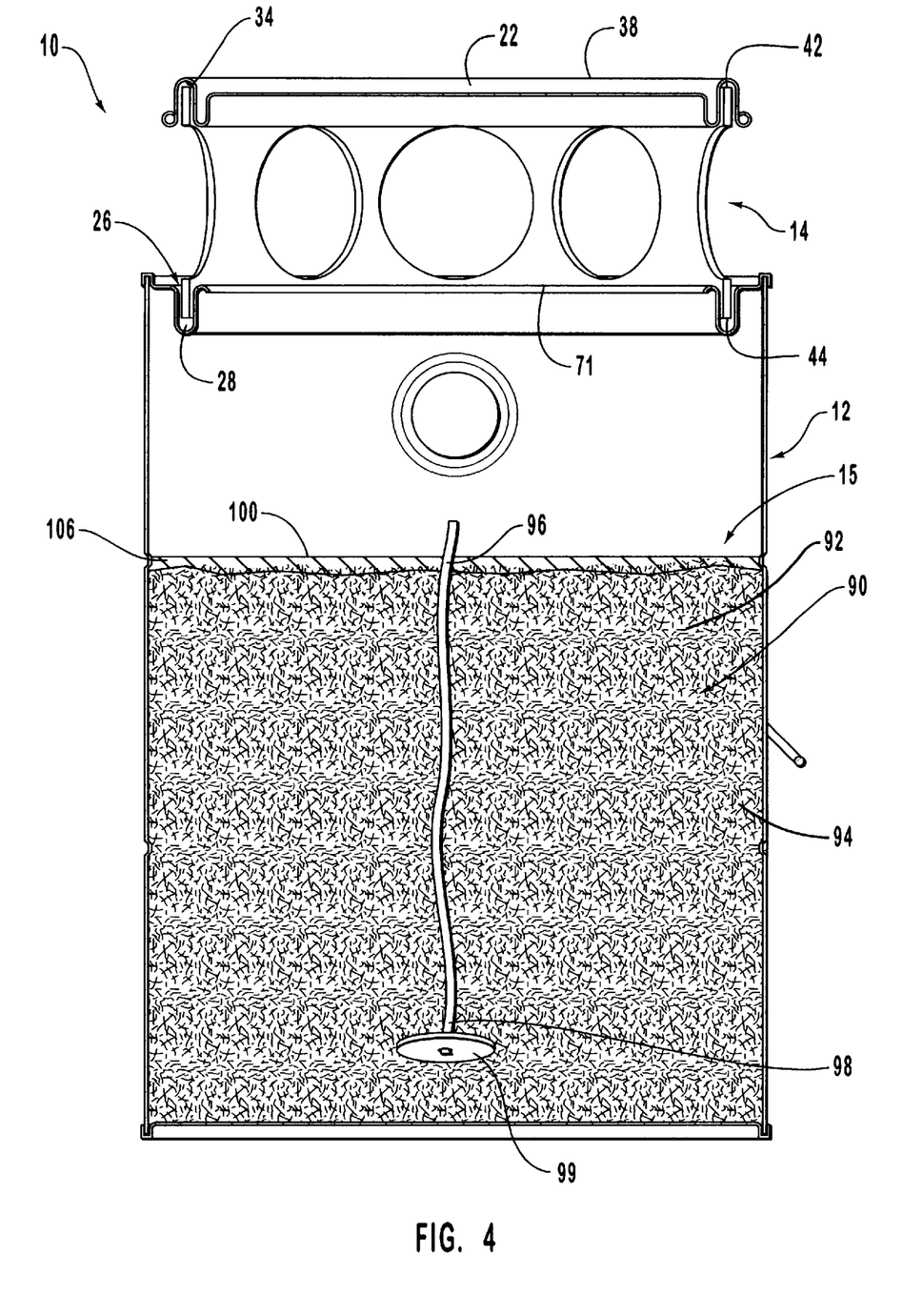
FIG. 4 is a cross-sectional, cutaway view of the assembled portable stove in the cooking position of FIGS. 2.

However, in the cooking position of FIGS. 2 and 4, lid 22 is inverted (i.e., turned upside down) with respect to FIG. 1. Lid 22 is also mounted on top of platform 14 such that edge 42 of platform 14 is disposed within annular upper groove 34 of lid 22. Opposing edge 44 of platform 14 is disposed within annular groove 28 of lip 26 container 12. This dynamic retains lid 22 on platform 14 and prevents lid 22 from falling off platform 14 during cooking. Lid 22 thus acts to selectively close the opening of container 12 and/or as a cooking surface.

As shown in FIG. 4, annular groove 28 of lip 26 of container 12 has substantially the same diameter as annular upper groove 34 of lid 22. Furthermore, as shown in FIGS. 2 and 3, walls 46 of platform 14 are configured such that edges 42, 44 of platform 14 align within corresponding grooves of the lid and platform. Consequently, an upper edge 42 of platform 14 fits within groove 34 of lid 22 and a lower edge 44 of platform 14 is disposed within groove 28 of container.

Platform 14 thus selectively retains lid 22 above container 12 when it is desired to light a fire within container 12 to thereby cook or heat using stove 10. Upon desiring to extinguish a fire within container 12, platform 14 and lid 22 can be removed from the cooking position and lid 22 can be placed downwardly onto container 12, as shown in FIG. 1.

Cooking platform 14 will now be discussed in further detail with reference to FIGS. 2–4 and 5a, 5b. In the embodiment of FIGS. 2–4, adjustable cooking platform 14 comprises a single, elongate member 60 which is configured in the shape of a cylindrical tube to form a collar having a slit 62 therethrough. First and second ends 64, 66 of member 60 can be moved apart from each other to thereby selectively adjust the configuration of the split-collar platform 14, as shown in FIGS. 5a and 5b.

Figure 5A:
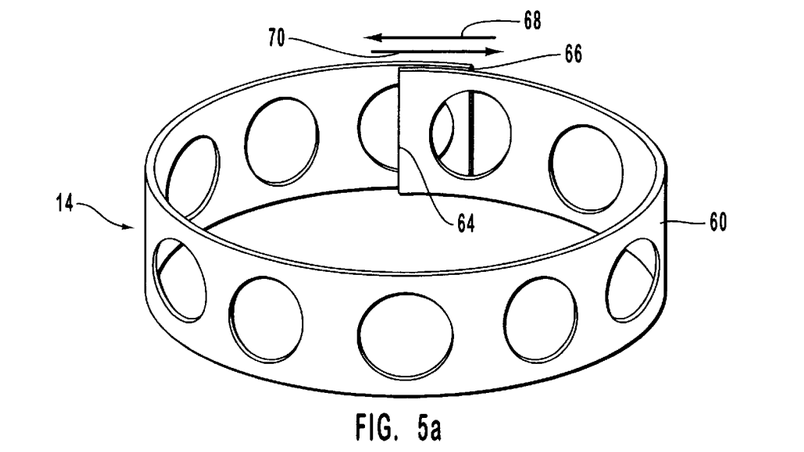
FIG. 5a is a perspective view of the split-collar platform of FIGS. 1–4 in a compressed position.
Figure 5B:
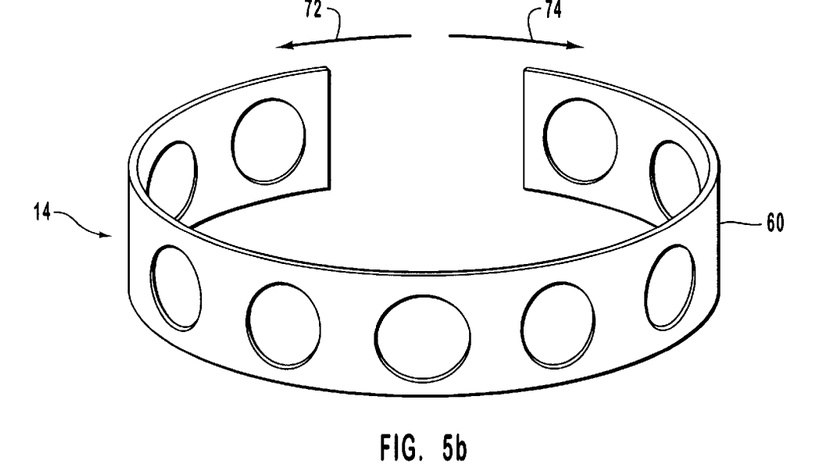
FIG. 5b is a perspective view of the split-collar platform of FIGS. 1–4 in an extended position.

Also, as shown in FIG. 5a, member 60 has sufficient flexibility that first and second ends 64, 66 of member 60 can be selectively compressed by pressing ends 64, 66 in opposing directions as shown by arrows 68, 70. Thus, platform 14 can be moved past the edge 71 of lip 26 (FIG. 4) of container 12 (or another portion of another container), which has an internal diameter which is smaller than a diameter of groove 28, as platform 14 is placed within container 12. Furthermore, ends 64, 66 of member 60 can selectively extend outwardly when moved in the directions of respective arrows 72, 74 of FIG. 5b. An adjusting force applied to member 60 may thus compress member 60 or extend member 60 from a neutral position, in which no force is applied.

In one embodiment, member 60 is comprised of a material which is sufficiently flexible to allow the first and second ends 64, 66 to be adjusted with respect to each other from a neutral position when subject to an adjusting force, yet is sufficiently resilient to enable the first and second members to substantially return to the neutral position upon removal of the force. Thus, after member 60 is compressed, in one embodiment member 60 substantially returns to the neutral position upon removal of the compressive force. As an example of this embodiment, if the neutral position for member 60 is substantially the diameter of groove 28, member 60 can be compressed in order to be moved past edge 71 of lip 26 for storage, but then expands within container 12 after being moved past edge 71. Also in this embodiment, following the recompression of member 60 required to move member 60 past edge 71 during removal from storage, member 60 expands again substantially to the neutral position, allowing member 60 to be readily placed in groove 28 with little or no adjustment.

Although such resilience is not required, it can be a convenient feature. In another embodiment, member 60 is comprised of a material which is bent to a new configuration following compression or extension, but can then be bent back to an originally desired configuration, e.g., such that member 60 fits within groove 28.

Thus, upon removal from container 12, ends 64, 66 extend outwardly or can be caused to extend outwardly such that platform 14 fits within groove 28 of container. In one embodiment, ends 64, 66 can be placed adjacent each other when platform 14 is placed within groove 28 of container, or can be extended even wider, to accommodate larger grooves of containers.

One embodiment of member 60 comprises 22 gauge cold rolled steel, which provides a desired adjustability. In another embodiment of the invention, member 60 comprises a material, preferably metallic, having a thickness in the range of about 10 gauge to about 30 gauge, alternatively in the range of about 16 gauge to about 26 gauge, alternatively in the range of about 20 gauge to about 24 gauge. Still another embodiment of member 60 comprises stainless steel. Of course, other sturdy materials that do not burn, melt, or otherwise deform when exposed to heat or flame as required by this invention may also be suitable.

As a consequence of the compressing capability of platform 14, platform 14 may be readily compressed, then inserted past the internal diameter of lip 26 when it is desired to store system 10. Upon desiring to use system 10, compressible platform 14 is readily removed from container 12 then disposed in groove 28. System 10 is thus self-contained and convenient to use. No additional frame or stand is required to place an object on top of while the object is being heated or cooked. System 10 also saves space and prevents the loss or separation of platform 14 from container 12 while platform 14 is disposed within container 12.

The compressible configuration of platform 14 is an example of means for selectively positioning the cooking platform with respect to the container in one of: (i) a storage position within the container; and (ii) a cooking position wherein the platform is oriented at least partially outside of the container. Platform 14 may be mounted on a container in a variety of different manners such as through a mating relationship, a friction fit, a non-annular lip, multiple lip members extending about the container wall, and a lip without a recessed groove, or other mounting means. Thus, a variety of different shapes and configurations are possible for achieving this function.

A platform useful in the system present invention can have a variety of different embodiments. In another embodiment, (not shown), a platform of the present invention is a cylindrical collar which is an endless collar i.e., which has no slit therethrough. This endless collar can have one more apertures therethrough, for example, and can be selectively mounted on a container, (e.g., on lip 26) and receive lid 22 or another cooking surface thereon as disclosed with regard to platform 14. This endless collar is convenient to employ to extend a cooking surface above a container.

In yet another embodiment, platform comprises a mesh material which is selectively disposed about lip 26. In yet another embodiment, the platform has portions in the upper and/or lower edges which are cut out to form passageways for oxygen to reach a fire within container. In another embodiment, the platform comprises a clip or a plurality of clips designed to hold a heating surface above lip 26. In another embodiment an extendable and compressible wire mesh endless collar or split collar is employed.

In yet another embodiment, the platform of the present invention comprises a single, substantially flat elongate member having a first end and a second end, the substantially flat member being sufficiently sturdy and sufficiently curved to: (i) be selectively mounted on a container; (ii) selectively support a cooking surface thereon; and to (iii) be selectively oriented within the container. Platform 14 of FIGS. 3, 5*a* and 5*b*, for example, may be a substantially flat member which is curved in the shape of a collar. In another embodiment, the platform has a C-shape which is sufficiently curved to allow the platform to stand, but has first and second ends which do not abut.

Figure 6:
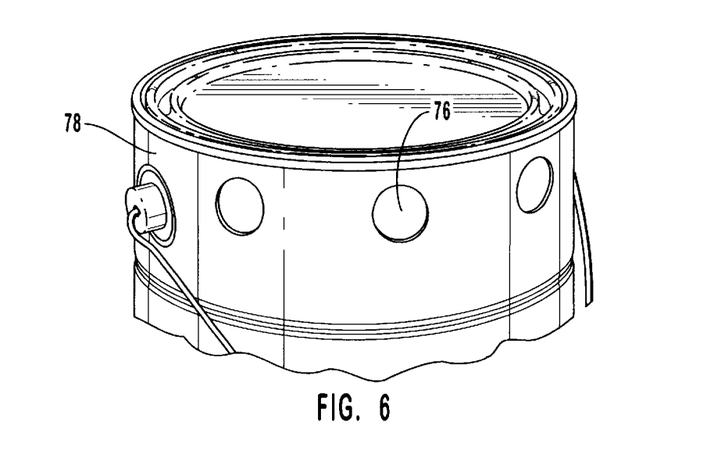
FIG. 6 is a cutaway view of the top portion of an alternate container of the present invention having holes extending through a wall of the container for oxygenating a fire within the container.

Holes 18 of platform 14 are an example of means for oxygenating the interior of the container. Other examples of such oxygenating means are available, such as holes having a variety of different shapes, or one or more holes 76 extending through a container body 78, as shown in FIG. 6. Thus, another embodiment of a platform is an adjustable or non adjustable platform similar to platform 14 (e.g., in the shape of a collar), but without apertures therethrough. Other examples of means for oxygenating the interior of the container include one or more holes placed within the cooking surface of the stove, one or more passageways extending between the upper and/or lower edges of the platform and the container, and one or more passageways extending between the upper and/or lower edges of the platform and the cooking surface. Thus, additional examples of means for oxygenating the interior of the container include a cooking surface which is configured or oriented such that oxygen reaches the interior surface of a container such as by covering only a portion of platform which does not have holes.

Figure 7A:
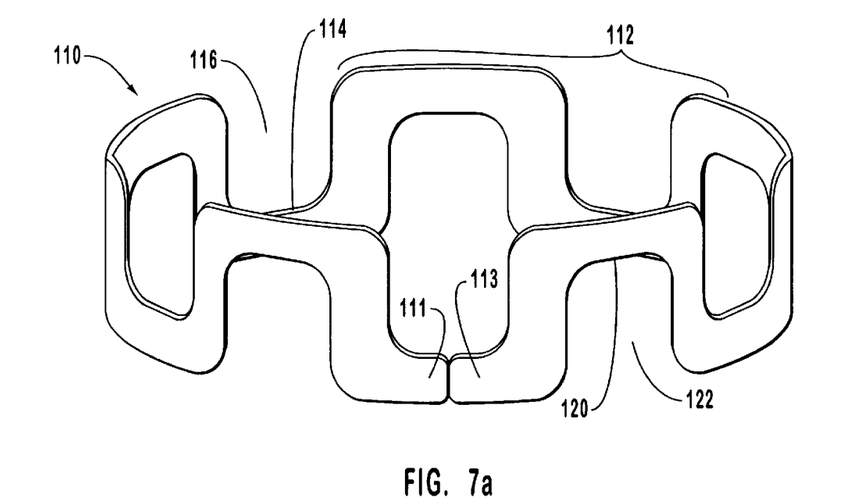
FIG. 7a is a view of an alternative platform of the present invention.
Figure 7B:
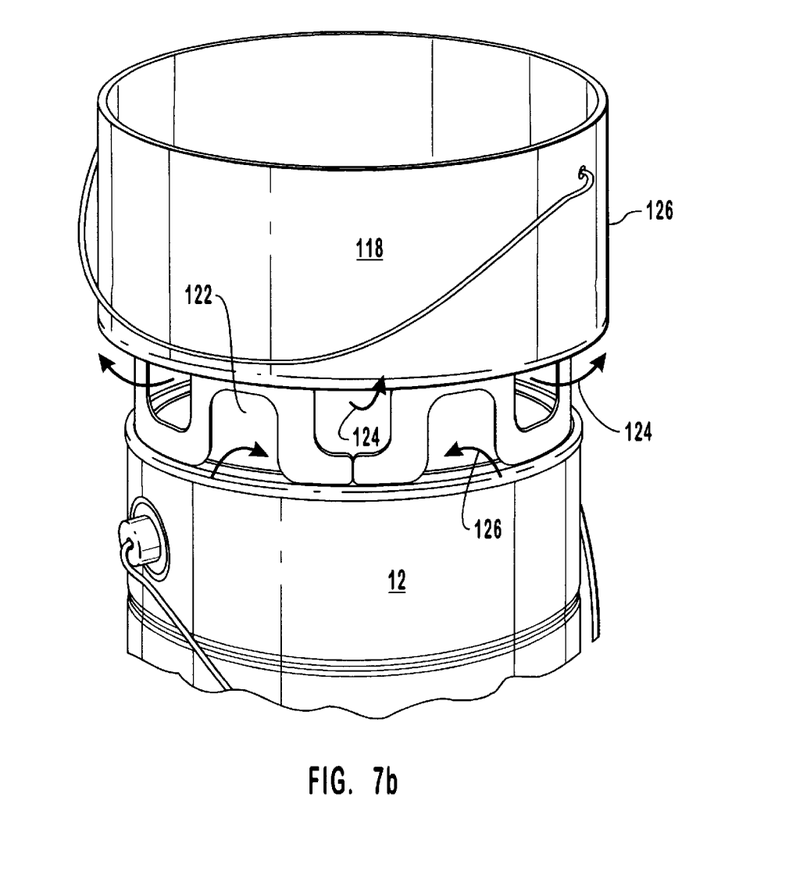
FIG. 7b is a view of the platform of FIG. 7a disposed between a container (cutaway view) and a cooking surface.

With reference now to FIGS. 7*a* and 7*b,* yet another embodiment of a platform 110 of the present invention is shown. Platform 110 comprises a split-collar platform formed from a single member having first and ends 111, 113 which can be moved with respect to each other. Ends 111, 113 are shown as abutting each other in FIGS. 7*a* and 7*b*. Platform 110 has the configuration of a plurality of alternating S-shaped members 112 coupled together and curved to form a split-collar.

Platform 110 has lower grooves 114 which define apertures 116 between a cooking surface 118 (e.g., a bowl or lid 22) and platform 110 and alternating upper grooves 120 which define apertures 122 between a container 12 and platform 14, each of which serve as additional examples of means for oxygenating the interior of container 12.

Platform 110 is advantageous because fire (represented by arrow 124) and heat within container 12 are allowed to flow past lower grooves 114 through apertures 116 and contact or at least more closely contact the bottom and sides 126 of a cooking surface 118, such as a bowl, thereby heating the cooking surface 118 more rapidly. Furthermore, oxygen (represented by arrow 126) is allowed to flow past upper grooves 120 through apertures 122.

Consequently, the dynamic of alternating upper and lower grooves 120, 114 substantially separates the flow paths of fire 124, which emanates past lower grooves 114 out of container 12 and oxygen 126, which flows past upper grooves 120 into container 12, thus substantially preventing the flow paths from interfering with each other. The alternating pattern of upper and lower grooves 114, 116 is an example of means for substantially separating the flow path of oxygen into container 12 from the flow path of fire out of container 12.

Platform 110 is preferably adjustable (e.g. compressible and extendible) such that platform 110 may be placed within container 12 and removed therefrom, as discussed above with regard to platform 14. In one embodiment, platform 110 is comprised of a material which is sufficiently flexible to allow the first and second ends thereof to be adjusted (e.g., compressed or extended as discussed above with regard to platform 14) with respect to each other from a neutral position when subject to an adjusting force, yet is sufficiently resilient to enable the first and second members to substantially return to the neutral position upon removal of the force. In one embodiment, platform 110 is comprised of 16 or 18 gauge cold rolled steel.

In another embodiment, (not shown) a platform having alternating grooves, (as in platform 110), is an endless collar, rather than being a split collar. As another optional embodiment, a single s-shaped member may be employed as the platform.

With reference now to FIGS. 3 and 4, examples of a combustible composition of stove system 10 will now be discussed. It will be appreciated by one skilled in the art that a variety of different compositions may be employed in the present invention and that the examples provided below are not to be construed as limiting the many combustible compositions which can be employed within container 12.

In the embodiment of FIGS. 3 and 4, combustible composition 15 disposed within container 12 preferably comprises: a mixture 90 comprising: (i) a base material 92; and (ii) a filler material 94 mixed within base material 92. Filler material 94 may comprise a cellulose-containing material such as wood shavings, for example. In one embodiment, a top layer 106 of composition 15 comprises a top portion of mixture 90 substantially saturated with base material (such as base material 92).

Optionally, a wick 96 extends through composition 15 and can be readily employed to selectively and initially ignite composition 15. Wick 96 is preferably a vertically oriented zinc core wick having a wick tab 99 disposed thereon to anchor wick 96 within composition 15. However composition 15 can bum evenly on the top surface 100 thereof even without the use of a wick.

Base portion 92 of mixture 90 preferably comprises a material which forms into a solid at room temperature, such as wax. Other examples of base portion 92 include oil and other combustible bases. Base portion 92 is preferably a long, even burning wax composition. Examples of different kinds of waxes which can be used in the present invention include petroleum waxes, such as petroleum derived hydrocarbon waxes. However, a variety of different waxes may be employed.

In order to increase the heat of composition 15, to assist composition 15 in burning evenly across the surface thereof, and to provide longer burning time for the composition 15, filler material 94 may be employed in the present invention, as discussed above. Filler material 94 may be any combustible material, such as wood, paper, cardboard, coal, and a variety of cellulose-containing materials.

Wood may comprise a variety of different forms and types of wood, such as natural wood branches, twigs, and processed wood. Wood preferably comprises hard wood particles such as shavings. Examples of hard wood which is useful within the filler include alder, maple, oak, cherry, or walnut. A soft wood such as pine may also be employed in a less preferred embodiment.

In one embodiment, filler 94 comprises wood particles which comprise a combination of (i) elongate wood shavings and, optionally, (ii) sawdust. By way of example, the elongate wood shavings may range in length from: (i) about 1/32 of an inch to about 3 inches, and/or (ii) about 1/4 of an inch to about 1½ inches. By way of example, the wood shavings may range in thickness from (i) about 1/100 of an inch to about ½ inch, (ii) about 1/32 of an inch to about 1/4 of an inch, and/or (iii) about 1/32 of an inch to about 1/8 of an inch. Wood shavings, particularly hard wood shavings are particularly advantages over sawdust because of increased burning time associated with the shavings, and the increased amount of oxygen allowed into enter into the composition through the use of shavings, as opposed to sawdust, which can form clumps in the composition.

In one embodiment of the invention, the combustible composition 15 comprises about 5% base by weight of the composition to about 95% base by weight of the composition and about 5% filler by weight of the composition to about 95% filler by weight of the composition. In another embodiment of the invention, composition 15 comprises about 30% base by weight of the composition to about 75% base by weight of the composition and about 25% filler by weight of the composition to about 70% filler by weight of the composition.

In another embodiment of the invention, combustible composition 15 comprises about 35% base by weight of the composition to about 55% base by weight of the composition and about 45% filler by weight of the composition to about 65% filler by weight of the composition. In another embodiment of the invention, composition 15 comprises about 25% base by weight of the composition to about 75% base by weight of the composition and about 25% filler by weight of the composition to about 75% filler by weight of the composition.

In another embodiment of the invention, the invention comprises about 40% base by weight of the composition to about 60% base by weight of the composition and about 40% filler by weight of the composition to about 60% filler by weight of the composition.

It will be appreciated from a review hereof that a variety of different combustible compositions may be employed in the present invention, including chemicals, oils, solid materials, and a variety of different materials. Top layer 106 of base material is optional and when employed, top layer 106 is applied in an amount of base material which is sufficient to substantially saturate the top portion of the mixture 90 to thereby seal the mixture 90 within container 12.

In one embodiment, the combustible composition is in the form of a compacted mixture of base and filler materials which is highly compacted in the shape of a disk, e.g., a circular disk which fits into a container. In one embodiment, the compacted disk is formed without a top layer of sealing wax thereon, but has a wick therein. Nevertheless, a variety of different embodiments of materials are available for use in system 10.

Compacted disks of the present invention are highly useful, emit a significant amount of heat, and are highly space efficient. In one embodiment, the disk has a thickness in the range of about 0.01 inches to about 10 inches and a diameter of about 0.1 inch to about 24 inches. For example, a circular disk may be approximately 7/8 of an inch in thickness and approximately 5½ inches in diameter, and weigh approximately 0.5 pounds.

Figure 8:
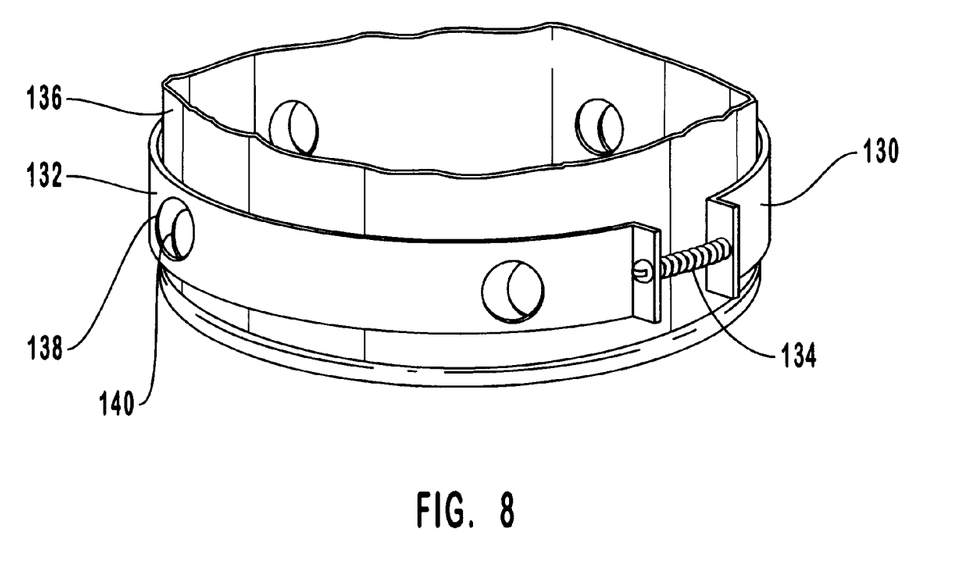
FIG. 8 is an example of an adjustable sealing ring disposed about a container, which is shown in a cutaway view.

With reference now to FIG. 8, another example of means for oxygenating the interior surface of a container comprises a window within the container which selectively allows a desired amount of oxygen to enter the container. In one embodiment, the window is at the bottom portion of the wall of the container.

As one example of such a window, one or more holes may extend through the container (e.g., the bottom portion of the container) and an adjustable sliding ring having corresponding hole(s) therein can be coupled to the container. Upon selectively sliding the ring, the hole(s) in the container are selectively covered or uncovered. In one embodiment, 4 holes are spread equidistantly about the container, each hole having a diameter of about ½ of an inch and an adjustable ring having 4 holes which correspond to the holes is slidably mounted to the container.

As an example of an adjustable sliding ring, as shown in FIG. 8, the ring 130 may comprise a C-shaped member 132 having a spring 134 coupled to both ends thereof to form an adjustable ring and to retain the C-shaped member on a container 136. In one embodiment, the diameter of the C-shaped member 132 may be selectively varied by pulling against the ends of the ring. Ring 130 is preferably circular to slide about a circular container.

One or more holes 138 in the ring correspond to one or more holes 140 in the container 136. Ring 130 is an example of means for selectively oxygenating the interior surface of a container. Ring 130 can selectively cover one or more holes in the container. However, a variety of different embodiments of adjustable sliding rings are available in the present invention, such as a perforated sliding ring comprising an endless member which slides about the container to selectively cover one or more holes therein.

In one embodiment, the internal diameter of the container is larger than the diameter of the combustible composition within the container such that a fuel disk or another combustible composition within the container does not touch the interior wall of the container adjacent the window.

Other embodiments of containers include containers having selectively openable doors which allow the placement of a combustible composition, such as a fuel disk into the container. However, it will be appreciated that the containers described herein are only provided by way of example and a variety of different containers are available in the present invention.

Method of Manufacture

A variety of different methods can be employed for assembling system 10. In one embodiment, the base, e.g., wax, is heated in a container to form a liquified base mixture. The heated, liquified base mixture is then mixed in a container with the filler, e.g., through stirring with filler 94 in an amount sufficient to form a thick mash mixture 90. The mash mixture 90 is then compacted until firm within container 12. In one embodiment, container 12 is filled to approximately 2/3 of container 12 to allow a space for placement of platform 14 therein, as shown in FIGS. 1 and 4.

An elongated wick 96 is then inserted into a tubular device which is then inserted into the compacted mixture 90. Upon removing the tubular device, wick 96 should be allowed to remain within the compacted mixture 90. Finally, an amount of base is poured on top of mixture 90, to form a top substantially saturated layer 106 of base and filler, thereby sealing mixture 90 within container 12 and preventing mixture 90 from being displaced out of container 12 when container 12 is jostled, tipped over, or otherwise moved. Composition 15 is allowed to dry before platform 14 is placed within container 12, after which lid 22 is placed thereon.

In one embodiment, the combustible composition comprises a combustible composition 15 weighing three pounds and comprising (i) about 44% wax composition by weight; (ii) about 1% mixing agent by weight; and (iii) about 55% by weight hard wood particles including sawdust and shavings of alder, maple, and oak.

Method of Use

As one example of use, lid 22 of FIG. 1, is removed from container 12, after which platform 14 is removed from container 12 and placed on lip 26 within groove 28. Wick 96 or optionally top surface 100 is ignited. With or without the use of wick 96 top surface 100 is allowed to catch fire before a cooking surface, such as lid 22 is placed on platform 14. After placing lid 22 or another cooking surface on platform 14, food and/or water may be cooked or heated thereon. Optionally, system 10 may be employed as a heat source, with or without lid 22 thereon.

The fire can be allowed to burn within container 12. If the fire begins to smolder the fire can be rejuvenated by stirring composition 15. The ash created by burning composition 15 can be stoked regularly to keep the flame at a consistent size. For reuse, it is recommended to scrape of the ash before re-lighting. Use in a well ventilated area is recommended. The fire may then be extinguished by placing lid 22 on container 12, for example.

After allowing lid 22 or another cooking surface and platform 14 and container 12 to cool down, the cooking surface is removed from platform 14. Platform 14 can then be compressed, as shown in FIG. 5a, then moved past lip 26 into container 12 and allowed to extend within the interior portion of container 12 below lip 26. Platform 14 is then placed on the remainder of the unburned composition 15 or on the floor of the empty container 12. Lid 22 is then placed within groove 28.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A cooking platform for selectively maintaining a cooking surface above a stove, the stove comprising a container having an opening, an exterior portion, and an interior portion, the cooking platform comprising:
   a single member having a first end and a second end; and
   means for selectively adjusting the position of the first end with respect to the second end, wherein the platform can be selectively compressed such that the platform can be moved into an interior portion of a container past a portion of the container which has an internal diameter which is smaller than the diameter of a groove of the container in which the platform is selectively received.

2. A cooking platform as recited in claim 1, wherein the platform comprises a collar.

3. A cooking platform as recited in claim 1, wherein the platform comprises a split collar.

4. A cooking platform as recited in claim 1, wherein the platform comprises a perforated collar.

5. A cooking platform as recited in claim 1, wherein the means for selectively adjusting the position of the first end with respect to the second end comprises the member being comprised of a material which is sufficiently flexible to allow the first and second ends of the member to be selectively moved with respect to each other.

6. A cooking platform as recited in claim 5, wherein the material is sufficiently flexible to allow the first and second ends to be adjusted with respect to each other from a neutral position when subject to an adjusting force, yet is sufficiently resilient to enable the first and second members to substantially return to the neutral position upon removal of the force.

7. A cooking platform as recited in claim 1, wherein the platform comprises a metallic member having a thickness in the range of about 10 gauge to about 30 gauge.

8. A cooking platform as recited in claim 1, wherein the platform comprises a metallic member having a thickness in the range of about 16 gauge to about 26 gauge.

9. A cooking platform as recited in claim 1, further comprising means for oxygenating the interior of the container on which the collar is mounted.

10. A cooking platform as recited in claim 9, wherein the means for oxygenating the interior of the container on which the collar is mounted comprises at least one aperture extending through the collar.

11. A cooking platform for selectively maintaining a cooking surface above a stove, the stove comprising a container having an opening, an exterior portion, and an interior portion, the cooking platform comprising:
    a single member having a first end and a second end; and
    means for selectively adjusting the position of the first end with respect to the second end, wherein the platform comprises means for substantially separating the flow path of oxygen into the container from the flow path of fire.

12. A platform as recited in claim 11, wherein the means for substantially separating the flow path of oxygen into the container from the flow path of fire comprises the platform comprising an S-shaped member.

13. A cooking platform for selectively maintaining a cooking surface above a stove, the stove comprising a container having an opening, an exterior portion, and an interior portion, the cooking platform comprising:
    a single, substantially flat elongate member having a first end and a second end, the substantially flat member being sufficiently sturdy and sufficiently curved to:
    (i) be selectively mounted on a container;
    (ii) selectively support a cooking surface thereon; and to
    (iii) be selectively oriented within the container;
    the first and second ends of the substantially flat member being flexibly movable with respect to each other to thereby enable the substantially flat member to be selectively oriented within a container, wherein the platform can be selectively compressed such that the platform can be moved into the interior portion of a container past a portion of the container which has an internal diameter which is smaller than the diameter of a groove of the container in which the platform is selectively received.

14. A cooking platform as recited in claim 13, further comprising means for oxygenating the interior of a container on which the elongate member is mounted.

15. A cooking platform as recited in claim 14, wherein the means for oxygenating the interior of a container on which the elongate member is mounted comprises at least one aperture extending through the elongate member.

16. A cooking platform as recited in claim 13, wherein the platform comprises a rectangular member.

17. A cooking platform for selectively maintaining a cooking surface above a stove, the stove comprising a container having an opening, an exterior portion, and an interior portion, the cooking platform comprising:
  a single, substantially flat elongate member having a first end and a second end, the substantially flat member being sufficiently sturdy and sufficiently curved to:
    (i) be selectively mounted on a container;
    (ii) selectively support a cooking surface thereon; and to
    (iii) be selectively oriented within the container;
  the first and second ends of the substantially flat member being flexibly movable with respect to each other to thereby enable the substantially flat member to be selectively oriented within a container, wherein the platform has the configuration of alternating S-shaped members coupled to each other.

18. A cooking platform for selectively maintaining a cooking surface above a stove, the stove comprising a container having an opening, an exterior portion, and an interior portion, the cooking platform comprising:
  a single, substantially flat elongate member having a first end and a second end, the substantially flat member being sufficiently sturdy and sufficiently curved to:
    (i) be selectively mounted on a container;
    (ii) selectively support a cooking surface thereon; and to
    (iii) be selectively oriented within the container;
  the first and second ends of the substantially flat member being flexibly movable with respect to each other to thereby enable the substantially flat member to be selectively oriented within a container, wherein the platform has lower grooves and alternating upper grooves.

19. A cooking platform for selectively maintaining a cooking surface above a stove, the stove comprising a container having an opening, an exterior portion, and an interior portion, the cooking platform comprising:
  a single, substantially flat elongate member having a first end and a second end, the substantially flat member being sufficiently sturdy and sufficiently curved to:
    (i) be selectively mounted on a container; and
    (ii) selectively support a cooking surface thereon;
  the single, substantially flat elongate member being configured in an s-shape having an upper and lower groove to thereby substantially separate flow of fire from a container from the flow of oxygen into the container.

20. A cooking platform for selectively maintaining a cooking surface above a stove, the stove comprising a container having an opening, an exterior portion, and an interior portion, the cooking platform comprising:
  a single member having
    a first end; and
    a second end; the first and second ends of the member being flexibly movable with respect to each other such that the first end is adjustable with respect to the second end,
  the single member comprising an S-shaped member.

\* \* \* \* \*